United States Patent

[11] 3,601,697

[72] Inventor Erwin Martin
     Munich, Germany
[21] Appl. No. 784,027
[22] Filed Dec. 16, 1968
[45] Patented Aug. 24, 1971
[73] Assignee Siemens-Aktiengesellschaft
     Munich, Germany

[54] AUTOMATIC TESTING APPARATUS RESPONSIVE TO EXCESS OVER FIXED LIMITS
     5 Claims, 3 Drawing Figs.
[52] U.S. Cl. .................................................. 324/102,
                                                         324/57 R
[51] Int. Cl. ............................................... G01r 19/00,
                                                         G01r 27/00
[50] Field of Search .......................................... 324/102,
     103, 133, 119, 57, 158; 340/266

[56] References Cited
     UNITED STATES PATENTS
     464,025  12/1891  Kammeyer ................. 324/133
     495,225   4/1893  Lintner ..................... 324/133
     3,256,475  6/1966  Kelly ....................... 324/133 X
     2,213,099  8/1940  Adorjan .................... 324/57 X
     2,505,072  4/1950  Sunstein ................... 324/57
     2,588,376  3/1952  Fox ......................... 324/57
     2,628,266  2/1953  Schroeder ................. 324/57
     3,179,248  4/1965  Manley ..................... 324/158 X Primary Examiner—Rudolph V. Rolinec
Assistant Examiner—Ernest F. Karlsen
Attorney—Birch, Swindler, McKie & Beckett ABSTRACT: Automatic testing apparatus for electrical devices which are tested by applying a variable voltage thereto, measuring the response of the device to the variable voltage, and detecting excesses of that response with respect to limits of a tolerance zone. To avoid necessity of use of apparatus which has a cathode ray oscilloscope, the response of the device is rectified so that fixed tolerance limits may be employed. Any excess over the fixed tolerance limits is detected.

AUTOMATIC TESTING APPARATUS RESPONSIVE TO EXCESS OVER FIXED LIMITS

GENERAL DESCRIPTION OF THE DISCLOSURE

This invention concerns a circuit arrangement for automatic testing of the response curve of a circuit device, such as those employed in the long distance communication field, with respect to tolerance limits, which limits are dependent on variation in the voltage supplied to the device. In order to test the electrical behavior of circuit devices under such conditions and to be able to conclude whether or not they match the desired standards, the prior art teaches that the circuit devices may be connected to a voltage source to obtain therefrom the variable voltage, and be also connected to a cathode ray oscilloscope so that the response of the device to the variable voltage could be exhibited on the oscilloscope. In such case, the characteristic curve of the circuit device will appear on the screen of the oscilloscope and an operator can determine whether or not that curve is within the tolerance limits of the tolerance zone for the device. This method of measurement takes time, is tedious, and is not suited to testing of large number of circuit elements.

In order to carry out measurements of this type in automatic fashion, I have suggested in my application Ser. No. 784,137 now U.S. Pat. No. 3,543,148 that a series of photodiodes be arranged on the screen of the oscilloscope to define the tolerance limits and therefore the tolerance zone. In such case, the apparatus can respond automatically to each excess of the characteristic curve with respect to the tolerance limits to cause automatic indication of such excess and automatic sorting of the circuit elements. This measuring method is only suited for responses to supply voltages which permit representation of the characteristic curve on the screen. Moreover, rather expensive apparatus, such as the photodiodes, the associated amplifiers and the cathode ray oscilloscope, are required in this technique.

It is an object of the present invention to provide a less costly and more simple circuit arrangement for automatic testing of circuit devices under the same conditions, which arrangement operates without use of a cathode ray oscilloscope.

The object of the invention is achieved by connecting in the testing system, for the duration of the testing operation, a network which effects a rectification of the characteristic curve of the device being tested, so that the tolerance limits will be constant throughout the entire range of variation of the source voltage.

With rectification of the characteristic curve by the network, no representation on a screen is necessary for determination of the position of this curve between the tolerance limits. Rather, an indication provided by simple measuring instruments having a single dimensional scale is sufficient. This is possible for the reason that the rectification operation changes the tolerance limits from values which change with the variation in the applied voltage, to constant values throughout that variation.

Not only does the circuit apparatus of the invention permit testing of the influence on the circuit device of continuous changes in the properties of the source voltage, but it is also possible with that arrangement to ascertain processes which occur only a single time and therefore cannot be reproduced on the picture screen of a cathode ray oscilloscope, or can at least only with difficulty be so reproduced.

According to a further feature of the invention, there is provided a measuring instrument with two or more limiting value indicators to be used for the automatic evaluation of the measuring result and to ascertain the position of the measured value within the range of the tolerance zone.

DETAILED DESCRIPTION OF THE INVENTION

Figure 1:
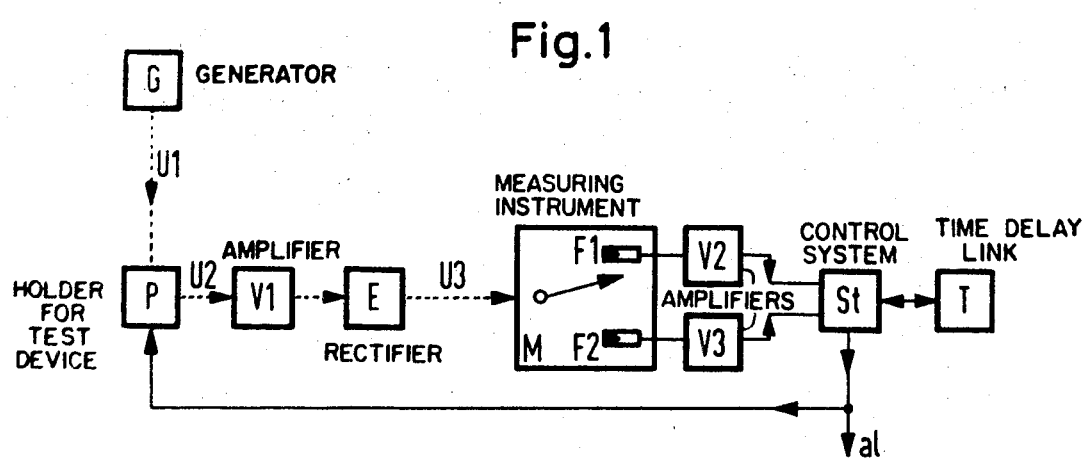
Figure 2:
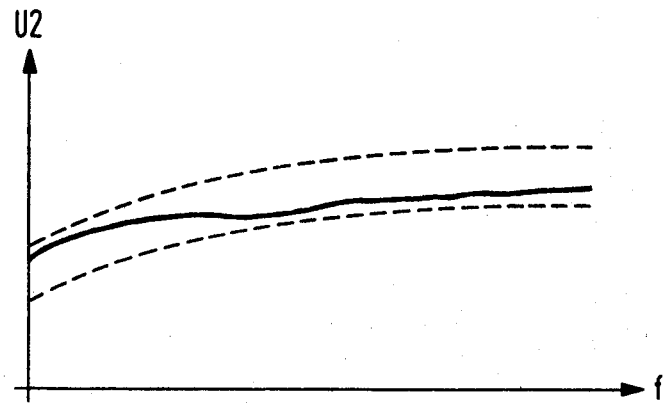
Figure 3:
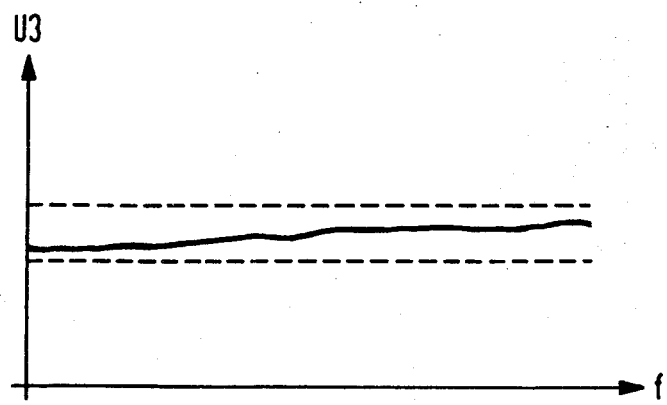

An illustrative embodiment of the invention will now be more fully described in conjunction with the attached drawing. In the drawing, FIG. 1 is a block diagram of a circuit arrangement in accordance with the invention;

FIG. 2 shows the characteristic curve of a device being tested, in comparison with the tolerance limits defining the tolerance zone; and, FIG. 3 is a representation similar to FIG. 2 showing the rectified characteristic curve and the corresponding fixed reference numerals.

The embodiment of the invention shown in FIG. 1 is a circuit apparatus for automatic testing of circuit devices such as filters or other four terminal devices whose response varies with the frequency of the applied voltage. The circuit device is placed in a holder P which provides the connections for supplying the output voltage U2 to the amplifier V1, as a result of supply of the input voltage U1 to the device, from generator G. In application of the invention to testing of filters, the applied voltage U1 will have a substantially constant amplitude, or this system will be compensated for a varying amplitude, but will vary continuously in frequency, and the voltage U2 will vary in amplitude with the change in frequency dependent upon the response of the network being tested to each change in frequency. Thus, as used herein a characteristic curve is a curve representative of the voltage output of a circuit device being tested as a function of the varying frequency of input signal. The output of amplifier V1 is supplied to a rectifier E, which may be of the network type, and which has a frequency response which is as nearly as possible coincides the tolerance limits, and therefore of the filter being tested.

FIG. 2 shows in solid line the characteristic curve of a typical filter, before rectification. The dotted lines above and below this curve indicate the limits of the tolerance zone within which this characteristic curve should fit, if the circuit device is of proper characteristics.

The characteristic curve U2, after passage through the rectifier E, is the almost horizontal straight line U3 which is shown in FIG. 3 in solid line. Also, the tolerance limits for this rectified curve are no longer variable with the frequency of the applied voltage, but rather are static throughout the entire frequency range.

The resulting measuring voltage U3 is supplied to a measuring instrument M, which may be of the light-operated galvanometer or other appropriate type, equipped with limiting value indicators. In FIG. 1 the measuring instrument M is shown as provided with photodiodes F1 and F2, defining the two static limiting values shown in FIG. 3.

If the examining system is to perform a different function, additional limiting value indicators can be provided, so that a plurality of ranges are thereby defined and the position of the indicator of the measuring instrument within the resulting ranges can be used as a criterion for sorting of the circuit devices. Moreover, fluctuation of the indicator (such as the light beam of a galvanometer), over several ranges, or with respect to several limiting value indicators, could also be examined.

The measuring instrument M is so designed that when the indicator thereof registers with the upper limiting value photodiode F1, the diode emits a pulse which is amplified by amplifier V2 and provided to the control system St. In similar fashion, when the indicator registers with the diode F2, a pulse is provided which is amplified in amplifier V3 and supplied to the control system. The control system St. may then control a mechanical sorting system which will automatically remove the item being examined from the support P and classify it into one of the classification groups, in accordance with the ascertained measuring value, or the position of that value within the tolerance zone. At the same time, the measurement can be indicated acoustically or optically by use of a voltage supplied over line al. Moreover, a meter can be connected to the control system St to determine for statistical purposes the number of examined circuit devices which are assigned to each classification group, within a certain time period.

In the apparatus of FIG. 1 the rectifier E is preferably a part of the amplifier V1, being formed for instance as a feedback network between output and input of the amplifier, with characteristics varying with the variation in applied voltage. For instance, if frequency of the applied voltage is the independent variable, the feedback network can readily be made frequency dependent in such fashion as to compensate for the expected variation in characteristics of the circuit device with applied frequency.

Of course, the particular rectification provided will vary with circuit devices of different characteristic curves. Accordingly, whenever a different device is to be tested in accordance with a different tolerance zone, varying in a different manner with applied frequency, a different rectifier network will be required. For this reason, it will be advantageous to use the illustrated circuit arrangement particularly for testing circuit devices present in large quantities. However, the rectifier E, with or without the amplifier V1 can be made of the plug-in type, so that the examining system can easily be changed in the shortest possible time for adaptation to a different type of circuit element to be examined.

For the purpose of automatic supervision of the testing system, it may be connected in such way that, upon the first excess of the lower measuring value limit, the limiting value indicator F2 will respond and enable the control system St to operate. However, if the lower limiting value indicator F2 does not respond a predetermined after application of a signal to the system, the time delay link T connected to the control system may provide a disabling pulse to the control system to indicate the existence of a fault in the testing system, or of a defective item being examined.

It will be evident that many changes could be made in the illustrated embodiment of the invention, without departure from the scope thereof. Accordingly, the invention is not to be considered limited to the illustrated embodiment, but only by the scope of the appended claims.

1. Apparatus for testing electrical circuit devices, comprising:

means for applying an electrical signal of varying frequency to a circuit device being tested, said circuit device thereby being actuated to produce an output signal having an amplitude which varies as a function of the frequency of the signal applied to said circuit device, said output signal thereby producing a characteristic curve for said circuit device, means having a characteristic curve substantially conforming to the characteristic curve for said circuit device connected to receive said output signal and to produce a rectified signal therefrom having an amplitude proportional to the amplitude of said output signal, and means responsive to said rectified signal for indicating when said rectified signal is not within predetermined tolerance limits.

2. The apparatus defined in claim 1 wherein said tolerance limits are located, respectively, at a predetermined higher amplitude level and a predetermined lower amplitude level from the characteristic curve of said circuit device.

3. The apparatus defined in claim 2 wherein said means for indicating includes at least two limiting value indicators for indicating, respectively, when said higher and lower limits are exceeded.

4. The apparatus defined in claim 3 having in addition a time-delay means for deactivating said apparatus upon a failure of said lower limit indicating means to respond a predetermined time period after application of a signal to said apparatus.

5. The apparatus defined in claim 1 having in addition a control means for classifying said circuit device into one of a plurality of categories, said one category corresponding to the response of said means for indicating to said circuit device.